United States Patent [19]
Wolber

[11] 3,898,791
[45] Aug. 12, 1975

[54] ELECTRICALLY DRIVEN TIMERS

[75] Inventor: Robert Wolber, Lauterbach, Germany

[73] Assignee: Gebruder Junghans GmbH, Schramberg, Wurtt, Germany

[22] Filed: June 25, 1974

[21] Appl. No.: 483,036

[30] Foreign Application Priority Data
June 30, 1973 Germany............................ 7324375

[52] U.S. Cl. ............ 58/28 A; 58/23 R; 317/101 CC
[51] Int. Cl. ........................................... G04b 45/00
[58] Field of Search ............ 29/177, 592; 58/53, 54, 58/55, 56, 52 R, 28 R, 28 A, 28 B, 28 D, 23 R, 23 D, 23 AC; 317/101 CC, 101 CP

[56] References Cited
UNITED STATES PATENTS

| | | | |
|---|---|---|---|
| 3,375,423 | 3/1968 | Mayer et al. | 58/23 R |
| 3,432,698 | 3/1969 | McCarty | 58/23 R |
| 3,583,148 | 6/1971 | Wolber | 58/28 R X |
| 3,601,974 | 8/1971 | Haag et al. | 58/28 A |
| 3,712,044 | 1/1973 | Wolber et al. | 58/23 R |
| 3,747,319 | 7/1973 | Riba | 58/28 A X |
| 3,780,521 | 12/1973 | Kurita et al. | 58/28 A |

*Primary Examiner*—Joseph W. Hartary
*Assistant Examiner*—U. Weldon
*Attorney, Agent, or Firm*—Burns, Doane, Swecker & Mathis

[57] ABSTRACT

An electrically powered timer mechanism includes a mounting plate and a conductor plate securable thereto. The mounting plate carries a timer mechanism, including a magnet assembly. The conductor plate carries a coil which is disposable in operating relationship with the magnet assembly when the mounting plate and conductor plate are connected. The mounting plate includes a slit which is predisposed relative to the magnet assembly for receiving the coil. The conductor plate has an aperture which can be placed on a peg of the mounting plate. The coil can be inserted into the slit to insure instant alignment relative to the magnet assembly. A screw can then be inserted to fixedly couple the mounting plate and the conductor plate.

13 Claims, 2 Drawing Figures

ELECTRICALLY DRIVEN TIMERS

BACKGROUND AND OBJECTS OF THE INVENTION

The invention relates to a subassembly for electrically driven timers, especially for time pieces, of the type having a housing, a mounting plate, a conductor plate and a self-contained coil attached to said mounting plate.

Basically, such a subassembly has already been known from the German utility Pat. No. 1,943,879. In the case of the subassembly shown there, the coil is attached by being glued in a slit of the conductor plate. In order to align the coil in the air gap of the balancing magnet system arranged on the mounting plate, a relatively expensive assembly is necessary. The conductor plate carrying the coil is hooked with an attachment to the mounting plate in a first working operation and, in a second working operation, is swivelled in its plane and possibly shifted somewhat in an elongated hole, such that the coil will be aligned in its desired spatial coordination relative to the balancing magnet system. Subsequentially, the conductor plate is fixedly attached to the mounting plate with a screw. Such an operation is relatively time consuming.

With this state of the art in mind, it is an object of the present invention to provide timesaving apparatus and methods for accomplishing the above-described mounting.

It is another object of the invention to provide such methods and apparatus for properly orienting the coil of timer substantially simultaneously with the mounting of the conductor plate to the mounting plate.

SUMMARY OF THE PREFERRED EMBODIMENTS OF THE INVENTION

In accomplishing these objects the present invention provides a mounting plate that carries a timer or balancing system, including a magnet assembly. The mounting plate has at least two supporting elements for the conductor plate, one of these holding elements serves simultaneously also for securing the conductor plate to the mounting plate. A coil is carried at one side of the conductor plate and is somewhat unsupported at its other side. Moreover, an alignment structure is fixedly provided on the mounting plate to accommodate the coil when the conductor plate is attached to the mounting plate, to align the coil in its spatial position in relation to the magnet assembly of the timer.

As a result of this solution according to the invention, one will thus achieve the advantage that, upon placing the conductor plate onto the mounting plate, (1) the conductor plate is immediately fixed in its proper spatial position, and (2) in addition, the coil is instantly aligned in proper spatial position relative to the magnet system of the timer and can be held in that position as well. Thus, the conductor plate can be attached on the plate immediately without aligning work.

According to a preferred embodiment of the invention, the alignment structure can be developed as a fork-shaped attachment with two parallel inside surfaces that define an open ended slit. These surfaces can be slightly flared at the open end of the slit.

However, according to another preferred form of the invention, it would also be possible to develop the alignment structure as a recess of the mounting plate with two parallel inside surfaces defining an open slit. These surfaces could possibly be slightly flared at the open side of the slit.

According to the preferred form of the invention, it has furthermore been provided that the holding elements be conically developed posts. These posts are disposed on the mounting plate to which are assigned corresponding bores on the conductor plate. For the attachment of the conductor plate on the mounting plate, one of the posts is provided with a bore for accommodation of a fastener, for example a self-tapping screw.

A particularly preferred embodiment of the subassembly according to the invention relates to the posts of the mounting plate being hollow. These posts accommodate correspondingly formed, conical additional posts that are attached to the housing. One of the posts includes a bore for the accommodation of the fastener.

THE DRAWING

The invention is to be explained in more detail in the following discussion by way of two preferred embodiments depicted in the drawing.

DETAILED DESCRIPTION OF THE PREFERRED EMBODIMENTS

Figure 1:
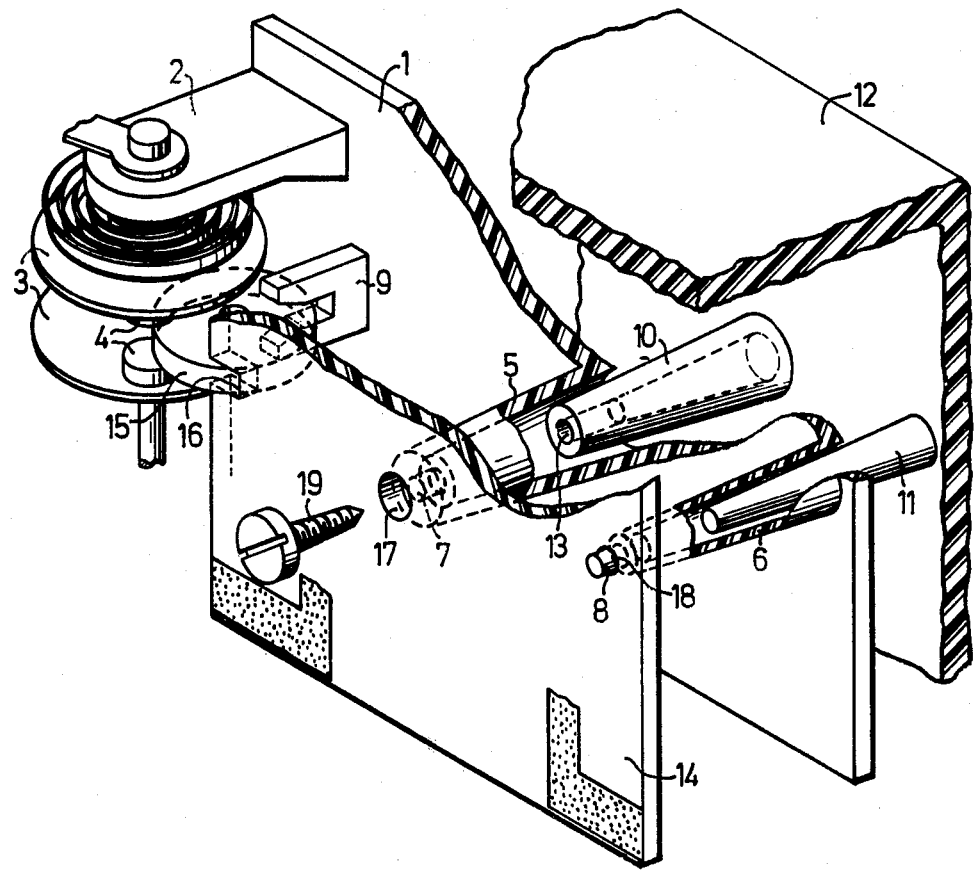
FIG. 1 is a fragmentary perspective view of a first preferred embodiment of the invention, partially in section, with parts broken away for clarity.

In FIG. 1, there is depicted a mounting plate 1 for a clock mechanism. On this mounting plate 1 a timer is disposed in the form of a balancing system 2. This system includes a balance wheel 3. On the balance wheel 3, permanent magnets 4 are attached, which serve for the electromagnetic control and the drive of the balancing system.

The mounting plate 1 carries a pair of mounting posts, namely a first post 5 and a second post 6, which are hollow and have a conical shape. The post 5 at its front, shown in a dotted line in the drawing, has a bore 7 to pass an attaching means through. The post 6 carries on its front a peg-like extension 8.

Furthermore, an alignment structure is provided on the mounting plate 1 in predetermined orientation relative to the magnets 4. In the preferred embodiment of FIG. 1 the alignment structure comprises an attachment 9, developed fork-shaped, the inside surfaces of which fork being generally parallel and expanded or flared slightly in the direction of their opening. The fork surfaces are oriented such that a coil inserted therein will be properly oriented relative to the magnets 4.

The mounting plate 1 can be placed onto two conical posts 10 and 11 of a clockwork housing 12. The post 10 likewise has a bore 13 on its front side, in which an attaching element can be clamped and given frictional or threaded connection. Thus, the conductor plate can be mounted to the mounting plate via the peg 18 and the screw 19, with the screw 19 serving to fixedly secure these plates together.

Finally, a conductor plate 14 carries the electronic construction units of the electric driving circuit for the clock mechanism. A coil 15 is disposed at one side in a slit 16 of the mounting plate. The other side of the coil protrudes from the conducting plate in somewhat unsupported fashion. This coil 15 serves as a transducer for the electric circuit on the conductor plate 14 and the magnets 4 of the balancing system 2.

The conductor plate 14 has two bores 17 and 18, which are alignable coaxially to the bore 7 of the post 5, and thus to the bore 13 of the post 10, and to the peg 8 of the post 6. Finally, reference number 19 designates a self-tapping screw, which connects the conductor plate 14 to the mounting plate 1 by way of the post 5 or its bore 7, and to the housing 12 by way of the bore 13 of post 10.

To assemble the mechanism, the coil 15 is mounted within the slit 16. Then the conductor plate 14, carrying the coil 15, has its bore 18 placed on the peg 8 of the pillar 6. Simultaneously, the coil 15 is inserted into the fork-like opening of the attachment 9 to attain proper alignment thereof in proper orientation relative to the magnets. Finally, the conductor plate 14 is fixedly attached to the pillar 5 by means of the self-tapping screw 19. As a result of the attachment 9, the coil 15 will have already been automatically aligned in the desired spatial position in relation to the magnets 4, so that no separate, pre-fixing coil alignment action is required. Any misalignment of the holes 7, 17, and 13 will be overcome by the self-tapping screw.

In case of use of the invention, a reduction in the assembly costs will result by about 20 percent, as compared to the initially discussed process, without any lowering of the quality of the arrangement.

Figure 2:
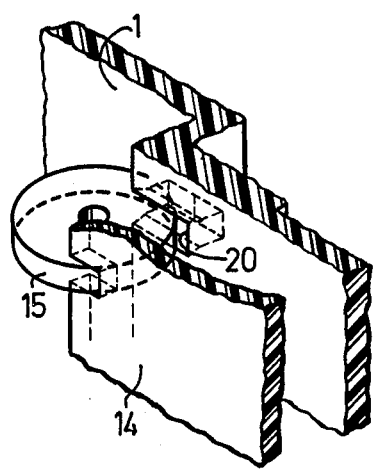
FIG. 2 is a fragmentary perspective view of a second preferred embodiment, partially in section.

The arrangement of FIG. 2 differs from that of FIG. 1 through the fact that the plate 1 is not developed flat, but is angular. Moreover, instead of an attachment 9, a recess 20 is provided for supporting and aligning the coil 15. The recess 20 is located in such manner relative to the magnets 4 that a coil inserted therein will be properly aligned in proper orientation relative to the magnets. Assemblage of the timepiece is effected in the same manner as described regarding the mechanism of FIG. 1, with the coil 15 being inserted into the recess 20 for automatic alignment.

SUMMARY OF ADVANTAGES

The present invention simplifies the procedure for assembling a timer mechanism and reduces the time required for such an operation.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A subassembly for electrically powered timer mechanisms, said subassembly comprising:
    housing means;
    mounting plate means;
    timer means mounted to said mounting plate means including magnet means;
    conductor plate means;
    connecting means for connecting said housing means, mounting plate means, and conductor plate means together;
    coil means mounted to said conductor plate means;
    said connecting means including at least two supporting means for mounting said conductor plate means to said mounting plate means;
    at least one of said supporting means receiving securing means for fixedly securing said conductor plate means to said mounting plate means; and
    alignment means carried by said mounting plate means in predetermined position relative to said magnet means for aligning said coil means in proper orientation relative to said magnet means when said conductor plate means is mounted to said mounting plate means.

2. A subassembly according to claim 1 wherein said coil is mounted at one side to said conducting plate means, the other side of said coil protruding from said conducting plate means to engage said alignment means.

3. A subassembly according to claim 2 wherein said alignment means is attached to said mounting plate means.

4. A subassembly according to claim 2 wherein said alignment means comprises an integral portion of said mounting plate means.

5. A subassembly according to claim 2 wherein said alignment means comprises means defining a slit for receiving said coil means.

6. A subassembly according to claim 2 wherein said alignment means comprises a fork-shaped element having a pair of parallel internal surfaces defining an open ended slit for receiving said coil means.

7. A subassembly according to claim 6 wherein said surfaces are flared outwardly at the open end of said slit.

8. A subassembly according to claim 2 wherein said alignment means comprises parallel surfaces formed within said mounting plate means, said surfaces defining an open ended slit for receiving said coil means.

9. A subassembly according to claim 8 wherein said surfaces are flared outwardly at the open end of said slit.

10. A subassembly according to claim 2 wherein said supporting means each comprise conical posts mounted on said mounting plate means and apertures being formed in said conductor plate means alignable with said posts.

11. A subassembly according to claim 10 wherein one of said posts includes a bore alignable with a corresponding one of said apertures of said conducting plate means for receiving a fastener.

12. A subassembly according to claim 11 wherein the other of said posts includes a peg at its outer end for reception in the other of said apertures.

13. A subassembly according to claim 11 wherein said posts are hollow, said housing means including additional conical posts shaped for reception within said conical posts of said mounting plate means; one of said additional posts including an opening for reception of said fastener means.

* * * * *